(12) United States Patent
Lee

(10) Patent No.: US 6,896,411 B2
(45) Date of Patent: May 24, 2005

(54) SELF-LUBRICATING BEARING AND METHOD OF PRODUCING THE SAME

(76) Inventor: Hu i-Long Lee, P.O. B x 90, Tainan City (TW)

( * ) Notice: Subject to any disclaimer, the term of this patent is extended or adjusted under 35 U.S.C. 154(b) by 55 days.

(21) Appl. No.: 10/615,947

(22) Filed: Jul. 10, 2003

(65) Prior Publication Data

US 2005/0008271 A1  Jan. 13, 2005

(51) Int. Cl.⁷ .............................................. B21P 17/00
(52) U.S. Cl. ................... 384/285; 29/898.059
(58) Field of Search .................. 29/898.054–898.059; 384/284, 285, 907, 463, 276

(56) References Cited

U.S. PATENT DOCUMENTS

| | | | |
|---|---|---|---|
| 379,531 A | * | 3/1888 | Douglas, Jr. ................. 384/285 |
| 1,743,645 A | * | 1/1930 | Whiteley ..................... 384/285 |
| 1,746,020 A | * | 2/1930 | Whiteley ..................... 384/284 |
| 1,751,906 A | * | 3/1930 | Hall ........................... 384/285 |

* cited by examiner

Primary Examiner—Thomas R. Hannon

(57) ABSTRACT

This invention relates to a self-lubricating bearing and a method of producing the same. The self-lubricating bearing includes a main body and a plurality of solid lubricant pieces. The main body has an inner annular wall surface, an outer annular wall surface, and a through hole defined by the inner annular wall surface. The solid lubricant pieces are embedded in a plurality of depressions of the inner annular wall surface by coating and grinding and each has a radial inside annular surface in a curve conforming to that of the inner annular wall surface. The forming of the depressions without radially penetrating through the outer annular wall surface to make the solid lubricant pieces embedded into the depressions with less amount by coating and grinding allows the self-lubricating bearing to reduce the material cost, and keep its structural strength and lubricating effect simultaneously.

1 Claim, 6 Drawing Sheets

SELF-LUBRICATING BEARING AND METHOD OF PRODUCING THE SAME

BACKGROUND OF THE INVENTION

1. Field of the Invention

This invention relates to a self-lubricating bearing and a method of producing the same, particularly to the self-lubricating bearing having a main body embedded with a plurality of solid lubricant pieces that have wear-resisting and lubricating functions, and the manufacturing method thereof.

2. Description of the Prior Art

Bearings are special objects for decreasing the wearing of components in performing relative motion. There are varied known bearings applied for different situations and designs. A known conventional self-lubricating bearing 1 capable of being sleeved on a relative-moving workpiece 10, as shown in FIGS. 1, 2 and 3, has a metallic main body 11 provided with an inner annular wall surface 111, an outer annular wall surface 112, a plurality of perforated holes 113 radially penetrating through the inner annular wall surface 111 and the outer annular wall surface 112, an outer oil groove 114, an inner oil groove 115, an oil hole 116 radially penetrating through the outer oil groove 114 and the inner oil groove 115, and a through hole 117 surrounded and defined by the inner annular wall surface 111 and capable of being sleeved by the relative-moving workpiece 10. A plurality of solid lubricant pieces 12 capable of being respectively inserted into the plurality of perforated holes 113 of the main body 11 are made of graphite added with $MoS_2$ so as to have the functions of resisting wear and containing a lubricating oil. Each of the plurality of solid lubricant pieces 12 has a radial inside surface 121 in a curve conforming to that of the inner annular wall surface 111 and a radial outside surface 122 in a curve conforming to that of the outer annular wall surface 112.

A method of manufacturing such known conventional self-lubricating bearing 1 includes the steps of: forming the plurality of perforated holes 113, the outer oil groove 114, the inner oil groove 115 and the oil hole 116 on the main body 11; inserting the plurality of solid lubricant pieces 12 in a stick form respectively into the plurality of perforated holes 113 in which the stick-like solid lubricant pieces 12 are devised to have an outer diameter slightly smaller than an inner diameter of the plurality of perforated holes 113 for the convenience of being inserted into the perforated holes 113 easily; heating the combination of the stick-like solid lubricant pieces 12 and the perforated holes 113 to make the stick-like solid lubricant pieces 12 securely fixed in the perforated holes 113 in which the inside surfaces 121 and the outside surfaces 122 of the stick-like solid lubricant pieces 12 are slightly protruded out of the inner annular wall surface 111 and the outer annular wall surface 112 after heated; grinding the protruded inside surfaces 121 and the protruded outside surfaces 122 to make the inside surfaces 121 and the outside surfaces 122 respectively smoothly integrated with the inner annular wall surface 111 and the outer annular wall surface 112 of the main body 11, which is very complicated in such manufacturing processes.

Although such known conventional self-lubricating bearing 1 is devised to have the plurality of solid lubricant pieces 12 directly inserted into the plurality of perforated holes 113 of the main body 11 to achieve its basic requirement, such design has the following disadvantages:

1. Greatly increasing the material cost:

The plurality of solid lubricant pieces 12 are inserted into the plurality of perforated holes 113 of the main body 11 with a depth the same as the thickness of the main body 11, which greatly increases the material cost. The cost of the solid lubricant pieces 12 is much higher than that of the main body 11. When the solid lubricant pieces 12 are worn off a depth of approximately 0.2 mm after being used in a period of time, the known conventional self-lubricating bearing 1 is required to be replaced with a new one because of serious accuracy deviation, which is also very wasteful.

2. Impossible to keep structural strength and lubricating effect simultaneously:

The plurality of perforated holes 113 penetrating through the main body 11 of the known conventional self-lubricating bearing 1 do bring a definite destruction to the whole structure of the main body 11, thus decreasing the structural strength of the main body 11. In fact, in order to increase the lubricating effect of the self-lubricating bearing 1, more spots with wear-resisting and lubricating functions are required to be arranged on the inner annular wall surface 111 of the main body 11, and this surely decreases the structural strength of the main body 11. On the contrary, in order to keep the structural strength of the main body 11, less spots with wear-resisting and lubricating functions are required to be arranged on the inner annular wall surface 111 of the main body 11, and this surely decreases the lubricating effect of the self-lubricating bearing 1. Therefore, it is impossible for the known conventional self-lubricating bearing 1 to keep structural strength and lubricating effect simultaneously.

3. The known conventional self-lubricating bearing 1 is manufactured with such complicated processes, which not only lengthens the working time, but also increases the total production cost.

SUMMARY OF THE INVENTION

The main purpose of the invention is to offer a self-lubricating bearing capable of reducing the material cost and keeping structural strength and lubricating effect simultaneously, and a method of producing the same.

A self-lubricating bearing in the present invention includes a main body and a plurality of solid lubricant pieces, the main body having an inner annular wall surface formed around a central axis thereof and an outer annular wall surface, the inner annular wall surface provided with an inner oil groove disposed thereon, the outer annular wall surface provided with an outer oil groove disposed thereon, at least one oil hole penetrating through and communicating with the inner oil groove and the outer oil groove, a through hole surrounded and defined by the inner annular wall surface;

characterized by the main body further having a plurality of depressions distributed on the inner annular wall surface without penetrating through the outer annular wall surface; the plurality of solid lubricant pieces capable of being respectively embedded into the plurality of depressions and each provided with a radial inside annular surface in a curve conforming to that of the inner annular wall surface; and, whereby the plurality of depressions devised to be distributed on the inner annular wall surface without radially penetrating through the outer annular wall surface may reduce the material cost by applying less amount of the solid lubricant pieces therein and allow more depressions to be distributed on the inner annular wall surface for more solid lubricant pieces to be embedded therein without damaging the structural strength of the main body, thus keeping structural strength and lubricating effect simultaneously.

A method of manufacturing the self-lubricating bearing in the present invention comprises the steps of:

a first step of forming a main body having an inner annular wall surface and an outer annular wall surface, the inner annular wall surface provided with an inner oil groove disposed thereon, the outer annular wall surface provided with an outer oil groove disposed thereon, at least one oil hole penetrating through and communicating with the inner oil groove and the outer oil groove;

a second step of forming a plurality of depressions on the inner annular wall surface of the main body without penetrating through the outer annular wall surface of the main body;

a third step of coating the inner annular wall surface of the main body with a liquid lubricant in a coating manner to make the liquid lubricant that respectively filled up in the plurality of depressions of the inner annular wall surface become a plurality of solid lubricant pieces after getting dry;

a fourth step of heating the main body coated with the liquid lubricant to make the plurality of solid lubricant pieces securely fixed in the plurality of depressions of the inner annular wall surface; and, a fifth step of grinding the inner annular wall surface of the main body to make radial inside annular surfaces of the embedded solid lubricant pieces in a curve conforming to that of the inner annular wall surface of the main body of the main body.

BRIEF DESCRIPTION OF DRAWINGS

This invention will be better understood by referring to the accompanying drawings, wherein.

DETAILED DESCRIPTION OF THE PREFERRED EMBODIMENT

Figure 4:
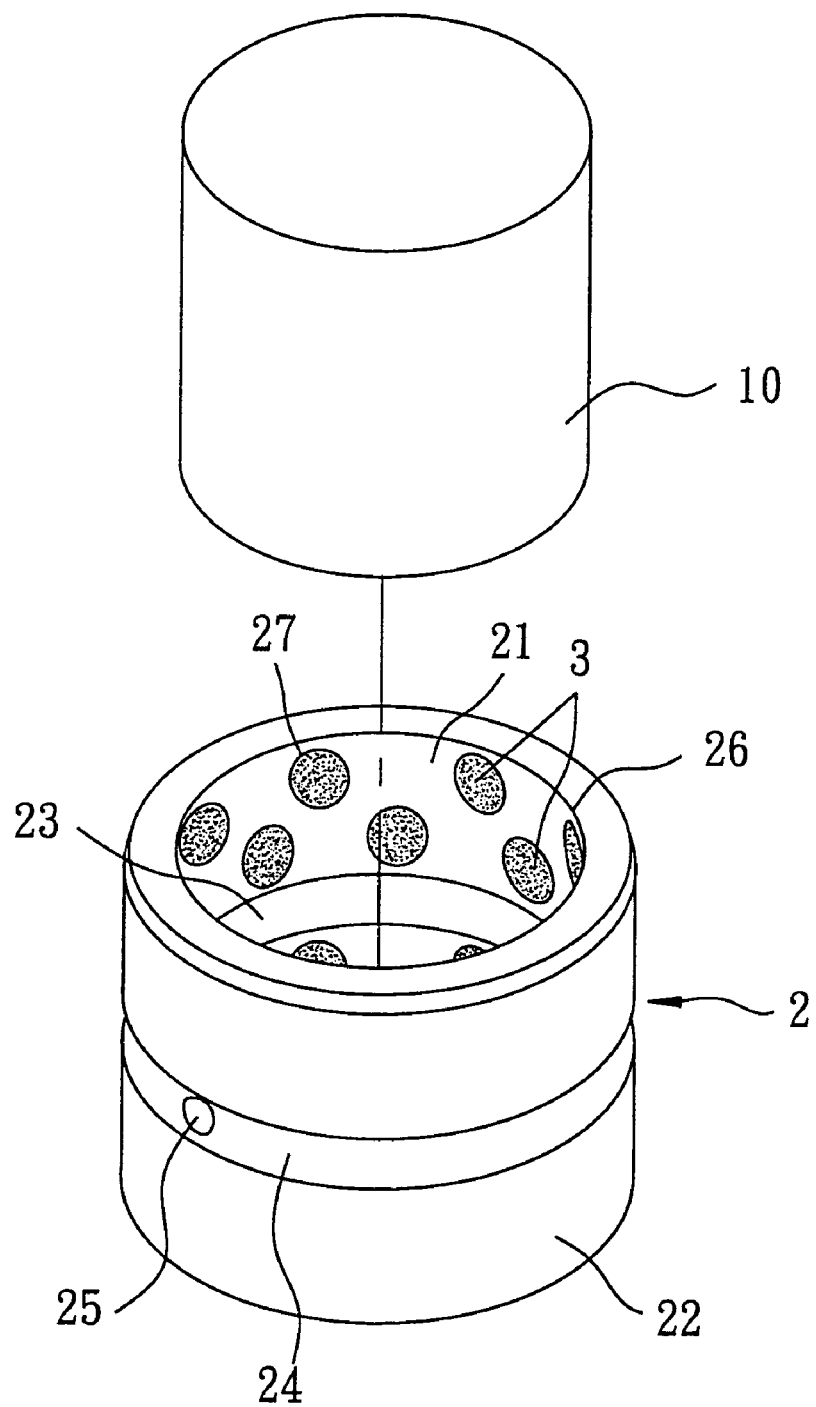
FIG. 4 is a perspective view of a self-lubricating bearing in the present invention.
Figure 5:
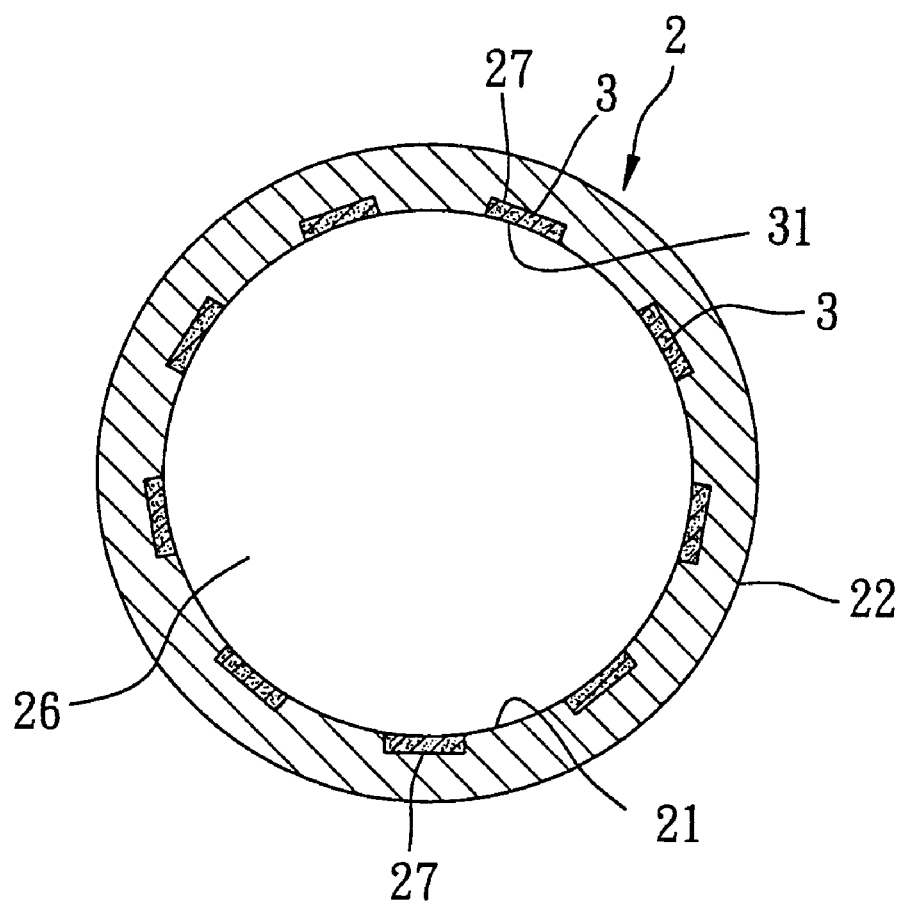
FIG. 5 is a sectional view of the self-lubricating bearing in the present invention; and, FIG. 6 is a flow chart of a method of manufacturing the self-lubricating bearing in the present invention.

A preferred embodiment of a self-lubricating bearing in the present invention capable of being sleeved on a relative-moving workpiece 10 in an axial direction, as shown in FIGS. 4 and 5, mainly includes a main body 2 and a plurality of solid lubricant pieces 3 capable of being embedded into the main body 2.

The main body 2 generally made of copper alloys such as tin bronze, phosphor bronze, etc., or iron or stainless steel has an inner annular wall surface 21 formed around a central axis thereof, an outer annular wall surface 22, an inner oil groove 23 recessed on the inner annular wall surface 21 in an outwardly radial direction, an outer oil groove 24 recessed on the outer annular wall surface 22 in an inwardly radial direction, an oil hole 25 radially penetrating through and communicating with the inner oil groove 23 and the outer oil groove 24, a through hole 26 surrounded and defined by the inner annular wall surface 21 and capable of being sleeved by the relative-moving workpiece 10, and a plurality of depressions 27 distributed on the inner annular wall surface 21 and recessed in a direction toward the outer annular wall surface 22. For example, when the main body 2 has a dimension of 5 cm (diameter)×4 cm (height)×0.4 cm (thickness), the plurality of depressions 27 may have a depth of 0.1 cm (i.e. 1 mm).

The plurality of solid lubricant pieces 3 made of graphite added with $MoS_2$ have the function of wear resistance and are capable of exuding out a lubricating oil when heated. The plurality of solid lubricant pieces 3 are capable of being respectively embedded into the plurality of depressions 27 of the inner annular wall surface 21 of the main body 2 and each is provided with a radial inside annular surface 31 in a curve conforming to that of the inner annular wall surface 21.

Figure 6:
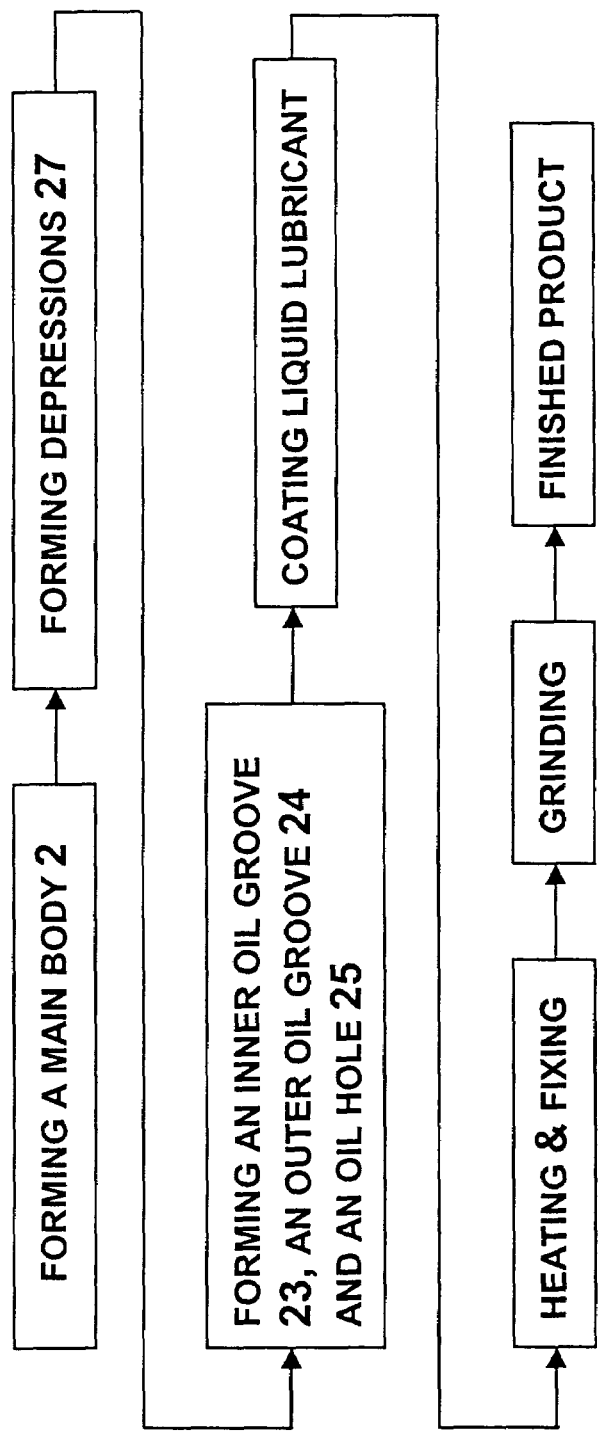

A method of manufacturing the self-lubricating bearing in the present invention, as shown in FIGS. 4 and 6, includes a plurality of steps, which are described below.

1. Forming the main body 2:

The main body 2 made of metal is provided with an inner annular wall surface 21 and an outer annular wall surface 22.

2. Forming the plurality of depressions 27:

The plurality of depressions 27 are formed on the inner annular wall surface 21 of the main body 2 without penetrating through the outer annular wall surface 22 of the main body 2 by lathe work.

3. Forming the inner oil groove 23, the outer oil groove 24 and the oil hole 25.

4. Coating with a liquid lubricant:

The inner annular wall surface 21 of the main body 2 is coated with a liquid graphite lubricant added with $MoS_2$. The liquid graphite lubricant filled up in the plurality of depressions 27 of the inner annular wall surface 21 of the main body 2 will become the pluralities of solid lubricant pieces 3 after getting dry.

5. Heating & fixing:

The main body 2 filled up with the plurality of solid lubricant pieces 3 is heated to make the plurality of solid lubricant pieces 3 securely fixed in the plurality of depressions 27 of the inner annular wall surface 21 of the main body 2. Generally speaking, the desired heating temperature is controlled in the range of 150° C. to 180° C., and the desired heating time is 1 hour to 1.5 hour.

6. Grinding:

The inner annular wall surface 21 of the main body 2 is processed by grinding to make the radial inside annular surfaces 31 of the embedded solid lubricant pieces 3 in a curve conforming to that of the inner annular wall surface 21 of the main body 2.

Figure 1:
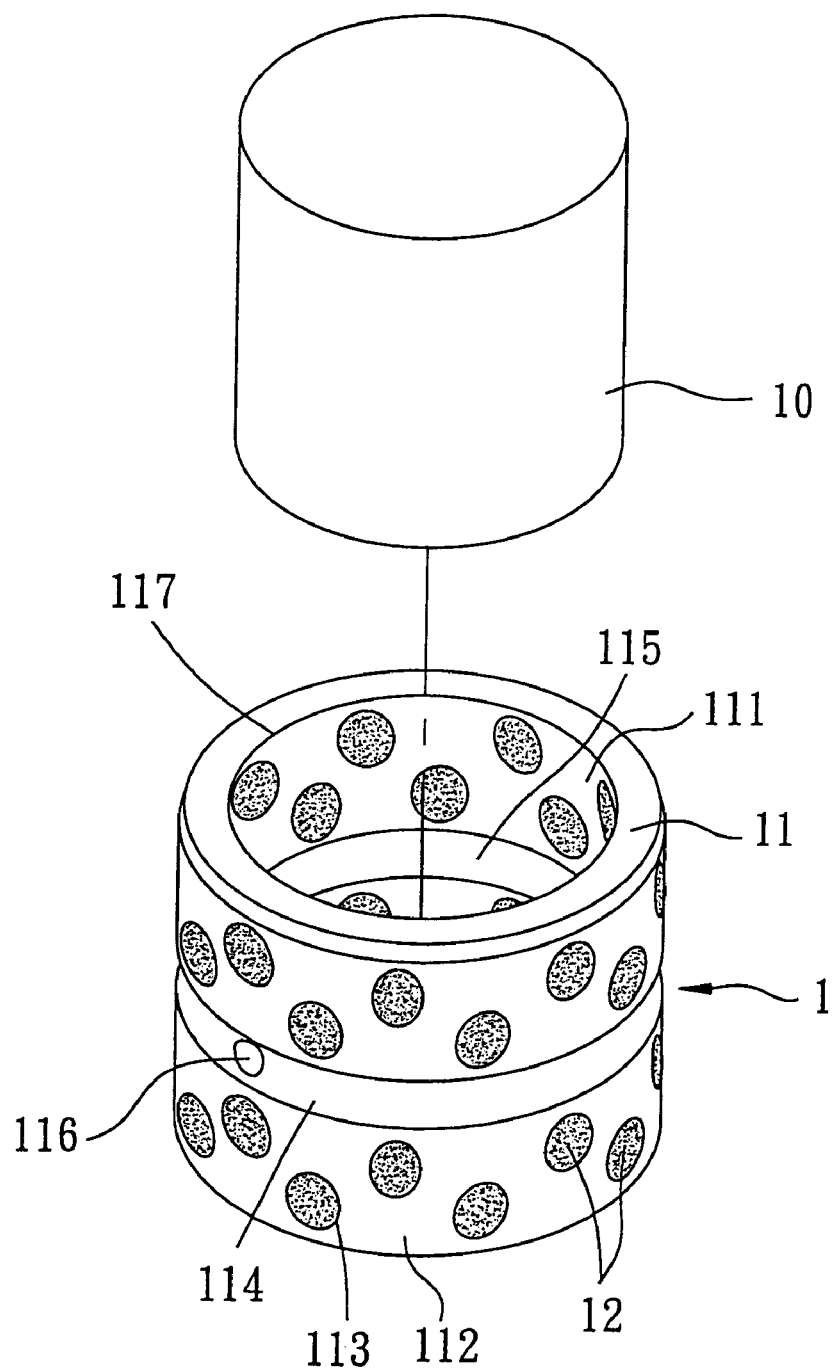
FIG. 1 is a perspective view of a known conventional self-lubricating bearing.
Figure 2:
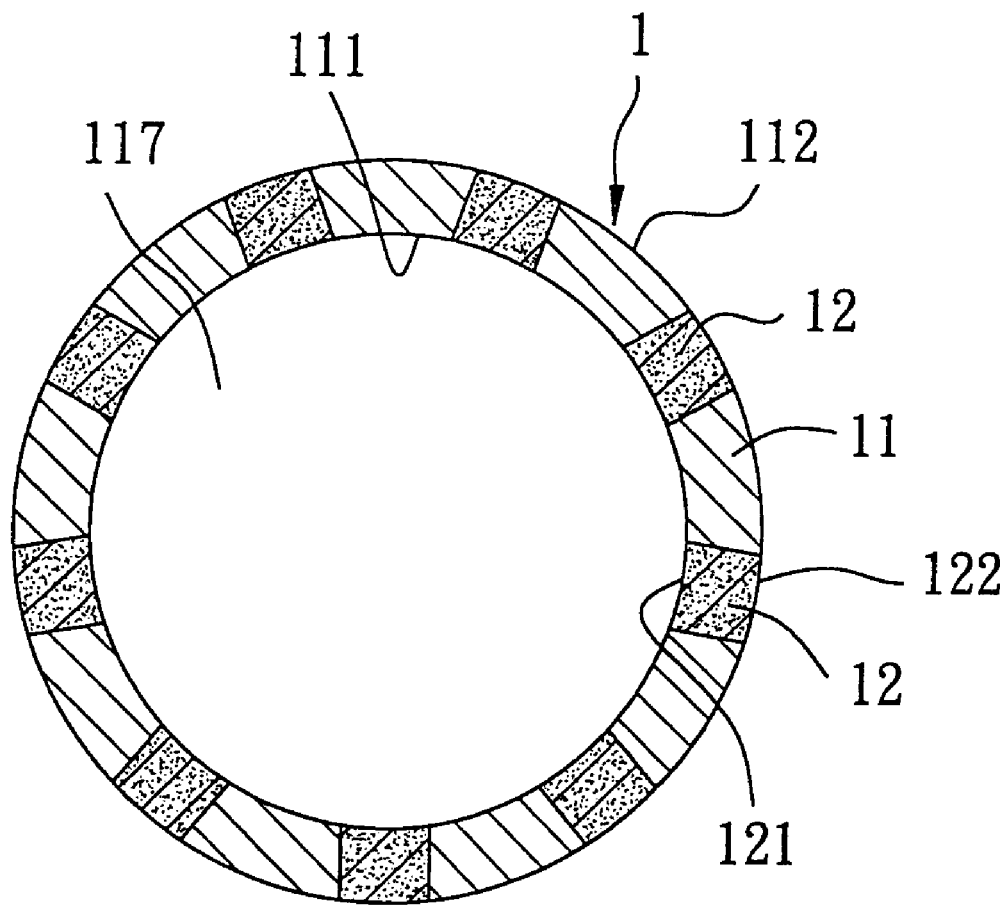
FIG. 2 is a sectional view of the known conventional self-lubricating bearing.
Figure 3:
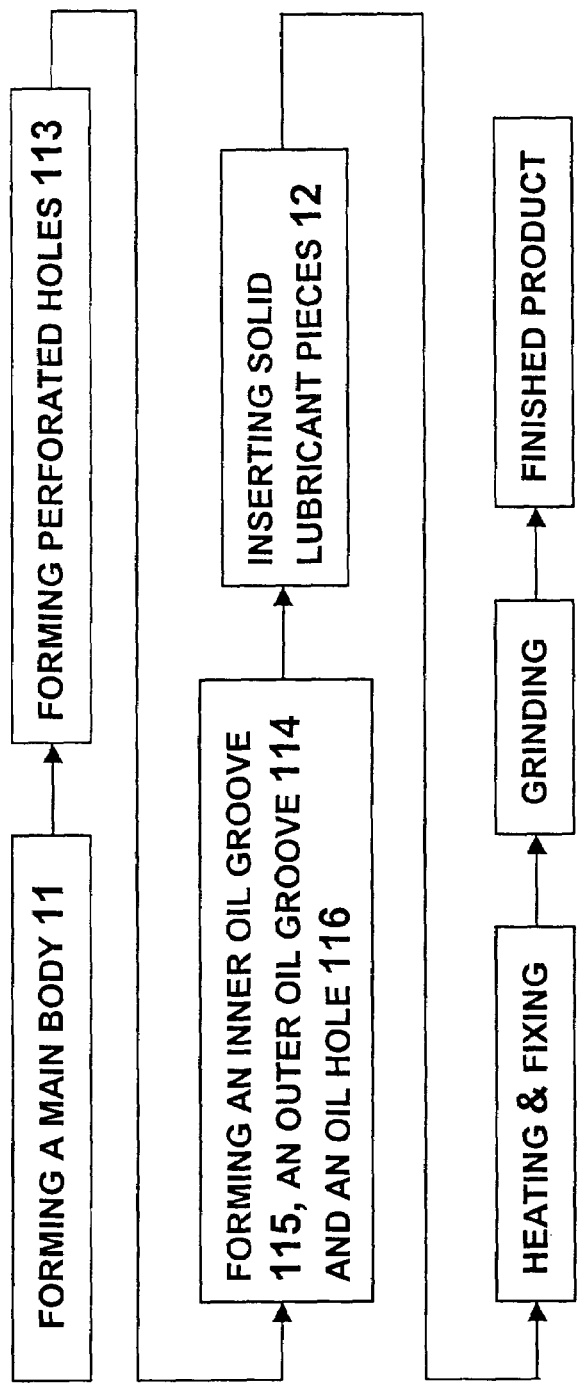
FIG. 3 is a flow chart of a method of manufacturing the known conventional self-lubricating bearing.

As described above in the present invention, the design of forming the plurality of depressions 27 on the inner annular wall surface 21 of the main body 2 not penetrating through the outer annular wall surface 22 of the main body 2 by lathe work and the design of embedding the plurality of solid lubricant pieces 3 that have wear-resisting and lubricating functions into the plurality of depressions 27 in a coating manner are not seen in the known conventional self-lubricating bearings. Moreover, the self-lubricating bearing manufactured by the method of the present invention has the advantages as follows:

1. Greatly reducing the material cost:

The plurality of solid lubricant pieces 3 with wear-resisting and lubricating functions are formed in a coating manner in the plurality of depressions 27 of approximately 1 mm in depth so the depth of the plurality of solid lubricant pieces 3 is much less than that of the solid lubricant pieces 12 as distributed on the known conventional self-lubricating bearing 1, as shown in FIG. 1. Again, in a self-lubricating bearing with a dimension of 5 cm (diameter)×4 cm (height) ×0.4 cm (thickness), for example, the solid lubricant pieces 3 in the present invention are only embedded in with a depth of 0.1 cm (i.e. 1 mm), while the solid lubricant pieces 12 of the known conventional self-lubricating bearing 1 are embedded in with a depth of 0.4 cm. Therefore, it is apparent that the material cost of the solid lubricant pieces 3 in the present invention is greatly reduced than that of the known conventional self-lubricating bearing 1. Moreover, the most important is that common self-lubricating bearings are generally required to be replaced with new ones because of serious accuracy deviation when they are worn off a depth of approximately 0.2 mm in use. However, when the self-lubricating bearing in the present invention is to be replaced, the solid lubricant pieces 3 embedded with a depth of 0.1 cm still enables the self-lubricating bearing to perform its wear-resisting and lubricating effects as expected.

2. Keeping structural strength and lubricating effect simultaneously:

While the perforated holes 113 that penetrates through the main body 11 of the known conventional self-lubricating bearing 1 will decrease the structural strength of the main body 11, the plurality of depressions 27 of the present invention that are directly distributed on the inner annular wall surface 21 required for better wear-resisting function and do not penetrate through the main body 2 enable the main body 2 to keep its structural strength so that the main body 2 has stronger structural strength than that of the main body 11, thus allowing more depressions 27 to be arranged on the inner annular wall surface 21 of the main body 2 to provide better wear-resisting and lubricating effects so that the self-lubricating bearing in the present invention can keep its structural strength and lubricating effect simultaneously.

While the preferred embodiment of the invention has been described above, it will be recognized and understood that various modifications may be made therein and the appended claims are intended to cover all such modifications that may fall within the spirit and scope of the invention.

What is claimed is:

1. A method of manufacturing a self-lubricating bearing, comprising the steps of:
  a first step of forming a main body having an inner annular wall surface and an outer annular wall surface, said inner annular wall surface provided with an inner oil groove disposed thereon, the outer annular wall surface provided with an outer oil groove disposed thereon, at least one oil hole penetrating through and communicating with the inner oil groove and said outer oil groove;
  a second step of forming a plurality of depressions on said inner annular wall surface of said main body without penetrating through said outer annular wall surface of said main body;
  a third step of coating said inner annular wall surface of said main body with a liquid lubricant in a coating manner to make said liquid lubricant that respectively filled up in said plurality of depressions of said inner annular wall surface become a plurality of solid lubricant pieces after getting dry;
  a fourth step of heating said main body coated with said liquid lubricant to make said plurality of solid lubricant pieces securely fixed in said plurality of depressions of said inner annular wall surface; and,
  a fifth step of grinding said inner annular wall surface of said main body to make radial inside annular surfaces of said embedded solid lubricant pieces in a curve conforming to that of said inner annular wall surface of said main body of said main body.

* * * * *